United States Patent [19]
Frederic

[11] Patent Number: 5,968,142
[45] Date of Patent: Oct. 19, 1999

[54] BEHAVIOR CONTROL OF APPARATUS HAVING A PHYSICALLY-REMOVABLE RESOURCE

[75] Inventor: Vu Frederic, Meylan, France

[73] Assignee: Hewlett-Packard Company, Palo Alto, Calif.

[21] Appl. No.: 08/887,317

[22] Filed: Jul. 3, 1997

[30] Foreign Application Priority Data

Jul. 5, 1996 [EP] European Pat. Off. ............. 96410076

[51] Int. Cl.[6] .................................................. G06F 13/00
[52] U.S. Cl. ................................................ 710/18; 710/1
[58] Field of Search .................................. 395/838, 821, 395/309; 713/201, 202

[56] References Cited

U.S. PATENT DOCUMENTS

| | | | |
|---|---|---|---|
| 5,233,658 | 8/1993 | Bianco et al. ............................. | 380/25 |
| 5,237,614 | 8/1993 | Weiss ....................................... | 380/23 |
| 5,537,654 | 7/1996 | Bedingfield et al. .................... | 395/834 |
| 5,602,919 | 2/1997 | Hurta et al. ............................... | 380/24 |
| 5,642,138 | 6/1997 | Hijikata ................................... | 345/200 |
| 5,671,374 | 9/1997 | Postman et al. ......................... | 395/309 |
| 5,726,595 | 3/1998 | Lin et al. ................................. | 327/155 |
| 5,869,823 | 2/1999 | Bublitz et al. .......................... | 235/380 |

FOREIGN PATENT DOCUMENTS 2 649 300  1/1991  France .

*Primary Examiner*—Joseph E. Palys
*Assistant Examiner*—Abu Hossain

[57] ABSTRACT

A computer (10, 11, 12) is provided with a physically-removable resource in the form of a smartcard (20) including user logon information (for local and/or remote resources). Upon at least the removal of the smartcard (20), different behaviours are produced depending on whether a predetermined keyboard key, such as the ALT key, is depressed. Thus, assuming that the smartcard (20) has been used for logging on, then upon removal of the smartcard if the ALT key is not depressed, a logoff procedure is effected whereas if the ALT key is depressed at the time the smartcard (20) is removed, an alternative behavior is effected such as the display of a user option menu. This approach of causing the behavior of the computer to vary upon resource removal in dependence on whether there is a current sustained operation of an input device, can also be applied to other types of removable resources and input devices.

21 Claims, 2 Drawing Sheets

1

BEHAVIOR CONTROL OF APPARATUS HAVING A PHYSICALLY-REMOVABLE RESOURCE

FIELD OF THE INVENTION

The present invention relates to controlling the behaviour of electronic apparatus having a physically-removable resource; in particular, but not exclusively, the present invention relates to controlling the behaviour of a computer upon removal of an integrated circuit card (often called a "smartcard") from a smartcard reader associated with the computer.

BACKGROUND OF THE INVENTION

Smartcards have a variety of uses amongst the most important of which is as a secure data-storage unit for storing critical information such as passwords and electronic funds information. Smartcards may also be used to provide specific functionality (such as encryption/decryption) under password control.

It is known to provide computers with smartcard interface units (often called smartcard readers though, in fact, data is frequently both read from, and passed to, the card). Such smartcard interface units have traditionally been provided as separate peripherals, interfacing with the computer through a dedicated port (for example, an RS232 serial port or more recently with the advent of the Universal Serial Bus for low speed peripheral connection, through a USB port). For user convenience, rather than providing the smartcard interface unit as a separate peripheral, it is also known to incorporate a smartcard interface into the keyboard unit of the computer.

In a typical computer-related smartcard application, encryption keys for electronic commerce transactions are stored in the smartcard and these keys must be read and used by the computer to enable a transaction with a remote third party via a computer network. The storage of passwords for accessing network resources is another common application (controlled remote logon) and, indeed, use of the computer itself may require the presense of a smartcard with the right passwords (controlled local logon).

The insertion of a smartcard into an active smartcard interface unit will generally be detected but whether or not the current operation of the associated computer is affected will depend on how the computer has been set up by a system manager or the user his/herself. For example, the computer may be set up by a system manager to respond to insertion of a smartcard by initiating a remote logon procedure using information held on the smartcard; however, this automatic behaviour may not always be appropriate as a user may be inserting the card for another reason entirely. Thus, whilst it is generally useful to have an automatically-triggered default behaviour on smartcard insertion, this automatic execution of the default behaviour needs to be overrideable.

A similar situation is known with respect to CD-ROM drives provided in computers both for reading CD-ROMs holding computer programs and data, and for playing back audio CD's. It is common practice for such CDs to be run automatically upon insertion (the "autorun" feature). However, immediate running may not always be required. To deal with this situation, in Microsoft's Windows 95 operating system, for example, it is possible to override the autorun feature by holding down the SHIFT key during CD insertion. This arrangement simply overrides autorun—it does not give the user any other choice.

Removal of a CD is always interpreted as meaning that the user no longer wishes to use the CD or any dependent program (on the basis that removal was not accidental which may be checked via a user dialogue window).

It is an object of the present invention to provide increased flexibility of control in the use of a smartcard (or, indeed, any other physically removable resource).

SUMMARY OF THE INVENTION

Whilst the above-described CD autorun override feature can be applied to the insertion of any removable resource to provide for override of an automatically-executed default behaviour, it has been found by the inventor that significant benefits also arise when the concept of user control through a sustained key-press is applied, not to resource insertion, but to resource removal. As already noted, removing a resource such as a CD clearly requires that use of the resource must cease—however, it is also a potential decision point for future action and the present invention relates to the recogniton of this fact and to providing the user with a convenient control arrangement at this point.

According to the present invention, there is provided electronic apparatus comprising:

a user input device by which a user can generate a predetermined sustained input to the apparatus;

interface means for interfacing with a physically-removable resource that can be moved into and out of working relation with said interface means;

event-indication means for generating an event indication in response to removal of said resource out of said working relation with the interface means; and control means responsive to each of at least certain of said event indications to produce different behaviours of the apparatus in dependence on whether at the time of occurrence of the event indication concerned there is a substantially-concurrent said predetermined sustained input from the input device.

With this arrangement, alternative behaviours can be chosen by a user at the time of instigating a resource-removal event.

Typically the electronic apparatus of the invention will be a computer in which case the input device may, for example, be a keyboard, mouse, graphics pad, touchscreen, or voice input device, the said predetermined sustained input being a corresponding input operation (such as key press in the case of the keyboard or mouse). As regards the physically removable resource, this may be a smartcard, a PCMCIA module, a floppy disc, a removable hard disc, or any other removable device including devices interworking with the apparatus through infrared or similar non-tangible links.

The different behaviours produced by the control means may vary widely but typically may include logoff procedures, apparatus locking, and user option menu display. One of the behaviours may also be a "do nothing" behaviour.

In a preferred embodiment, the input device is a keyboard and the physically-removable resource a smartcard including user logon information (for local and/or remote resources). Upon at least removal of the smartcard, different behaviours are produced depending on whether a predetermined keyboard key, such as the ALT key, is depressed. Thus, assuming that the smartcard has been used for logging on, then upon removal of the smartcard if the ALT key is not depressed, a logoff procedure is effected whereas if the ALT key is depressed at the time the smartcard is removed, an alternative behaviour is effected such as the display of a user option menu (for example, the Security Menu where Microsoft's Windows NT (Trademark) operating system is being employed).

More than one alternative behaviour can be made available by providing for the control means to recognise different sustained inputs (such as pressing the ALT or pressing the CTRL key of a keyboard).

According to another aspect of the invention, the use of a sustained user input during insertion of a data-storing removable resource can be used to control what data is read from the resource.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
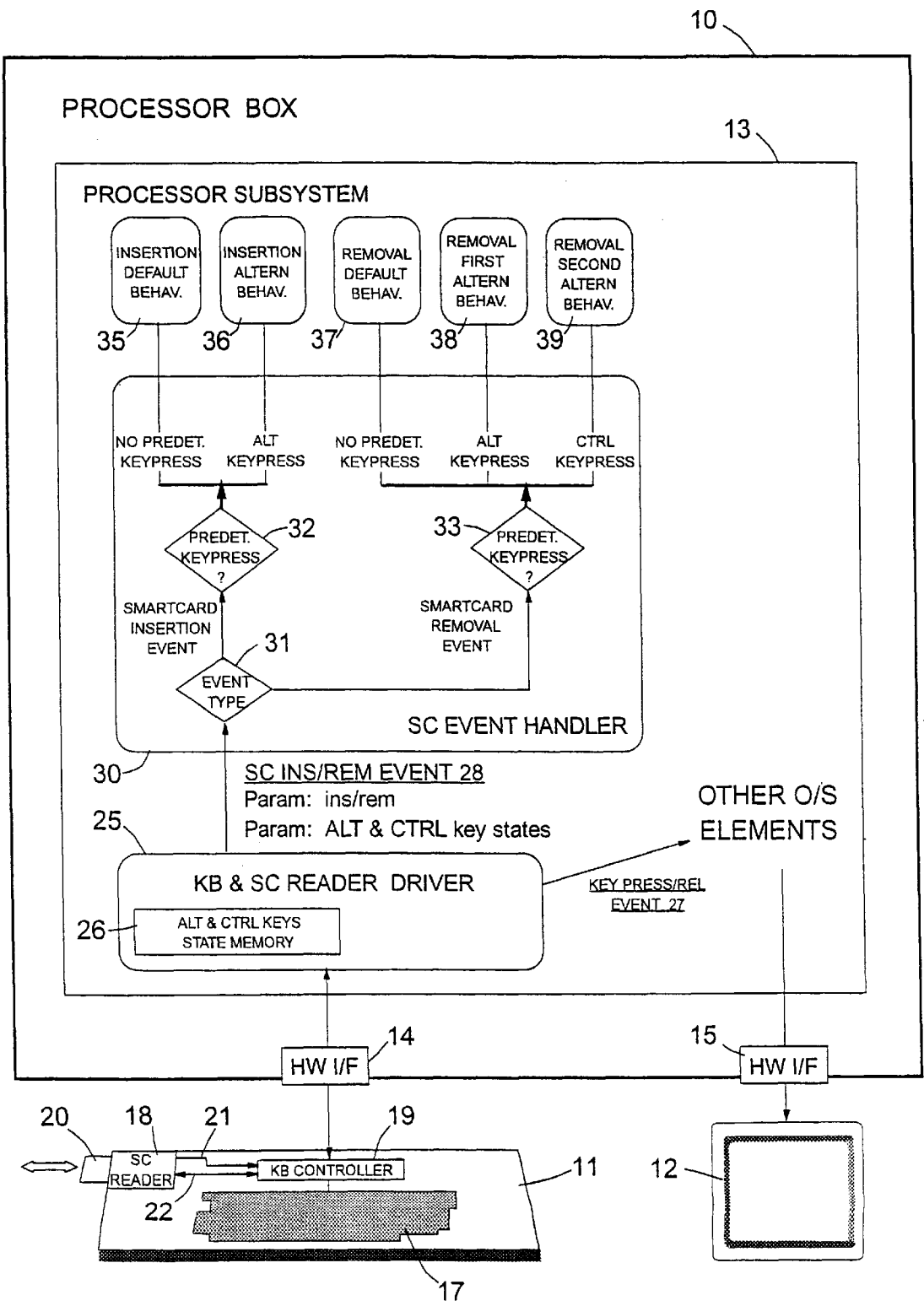
FIG. 1 is a diagrammatic representation of a first computer embodying the invention.

FIG. 1 shows in highly schematic form a computer comprising a processor box 10, a keyboard unit 11 and monitor 12. A processor subsystem 13 of the processor box 10 interfaces with the keyboard unit 11 through a hardware interface 14 and with the monitor 12 through a hardware interface 15. In standard manner, the processor subsystem 13 runs various programs including operating system elements and application programs; the functional program elements of relevance to the present embodiment of the invention are depicted in FIG. 1 by rounded boxes within the boundary of the processor subsystem 13.

The keyboard unit 11 comprises not only a key matrix 17 (with ALT and CTRL keys) but also a smartcard interface unit 18. In the present case, the unit 18 is provided to enable secure logon/logoff, essential user ID and password information being held on a smartcard 20. Both the key matrix 17 and smartcard unit 18 are controlled by a keyboard controller 19 that serves to interface each of these components with the processor subsystem.

The smartcard interface unit 18 includes a presence detector (not shown) for providing a presence signal over line 21 to the controller 19 to indicate whether or not smartcard 20 is present in the unit 18 in a working position. In this working position the smartcard is operatively connected to control and data lines 22 through which the smartcard can communicate with the controller 19. The controller 19 is responsive to the smartcard presence signal on line 21 to send to the processor subsystem 13 a smartcard insertion signal upon insertion of smartcard 20 into unit 18, and a smartcard removal signal upon removal of the smartcard 20. These insertion and removal signals are multiplexed with other signals exchanged between the controller 19 and processor subsystem 13. These other signals include not only smartcard control and data signals for exchange with the smartcard itself, but also key press and key release signals that indicate to the subsystem 13 when a key of the key matrix 17 is depressed or released, the identity of this key being indicated by a corresponding keycode.

In the processor subsystem 13, interfacing with the keyboard unit 19 is controlled through a keyboard & smartcard driver 25. Amongst other tasks, this driver 19 generates event messages in response to the signals it receives from the controller 19. The event messages are sent to appropriate event handlers; in the present case, only the smartcard event handler 30 is shown and indeed, only the part of this handler 30 relevant to the present invention is illustrated and described.

When driver 25 receives a key press or key release signal from the controller 19, it generates a corresponding key press or key release event message 27 and transmits it to a keyboard event handler (not shown). In addition, in accordance with the present embodiment of the invention, the driver 25 checks to see if the key press/release signal relates to particular keys, in this case the ALT and CTRL keys; if the key press/release signal does relate to either of these keys, the driver 25 updates a corresponding key state indicator for the key concerned, these key state indicators being held memory 26.

When driver 25 receives a smartcard insertion or removal signal from the controller 19, it generates a smartcard insertion/removal event message 28 which it transmits to the smartcard event handler 30. Each such event message comprises a first parameter indicating whether the event is an insertion event or a removal event, and a second parameter indicating whether or not the ALT or CTRL is currently pressed as determined from the key state information held in memory 26.

The smartcard event handler 30 is responsive to the insertion/removal event messages 28 to produce appropriate behaviour; by passing the handler key state information in respect of the ALT and CTRL keys, it is possible to arrange for the handler 30 to produce different behaviour in dependence on the state of the ALT and CTRL keys. More particularly, upon the handler 30 receiving an insertion/removal event message, it initially determines from the said first parameter of the message whether the event is an insertion or removal event (step 31).

For an insertion event, the handler 30 next determines (step 32) whether either of the predetermined keys of interest (in this case, the ALT and CTRL keys) is currently pressed. If neither of the ALT and CTRL keys are pressed, then the handler 30 initiates an insertion default behaviour 35 which in the present case is a logon procedure involving the reading of user ID and password information from the smartcard. If, however, the ALT key is indicated as being pressed, then an insertion alternative behaviour 36 is initiated such as the display of certain non-confidential information held on the smartcard (for example, via a menu of public fields on the smartcard).

In the present example, for an insertion event the state of the CTRL is ignored, depression of this key during card insertion having no effect on the behaviour initiated by the handler 30. However, it would of course be possible for a second alternative behaviour to be initiated if the CTRL was depressed rather than the ALT key. If both keys were pressed, then either one could be given priority (for example, the behaviour associated with ALT key depression could be initiated) or an alternative behaviour specific to this dual key depression could be initiated.

With regard to smartcard removal events, if neither of the ALT key and CTRL keys are pressed, then the handler initiates a removal default behaviour 37 which in the present case is a logoff procedure. If, however, the ALT key is indicated as being pressed a first alternative behaviour 38 is initiated whereas if the CTRL key is indicated as pressed, a second alternative behaviour 39 is initiated. The first alternative behaviour is in the present case the display of a user option menu followed by execution of the option selected by the user; more particularly, where the operating system being used is the Microsoft Windows NT (Trademark) operating system, the user option menu displayed can be an enhanced security menu giving the user the choice of logoff, shutdown, restart, lock the computer, or ignore event (this latter option permits a different card, such as a credit card, to be inserted during a session). The second alternative behaviour is, in the present case, the locking of the computer. If both the ALT and CTRL are pressed, then one of the first and second alternative behaviours is given priority.

From the foregoing, it will be appreciated that the FIG. 1 embodiment provides substantial flexibility for the user to choose a desired behaviour upon insertion/ removal of a smartcard. The same general approach can be used in other cases and FIG. 2 illustrates an embodiment in which the physically-removable item is a PCMCIA module 46 rather than a smartcard, and the input device used to command an alternative behaviour is a mouse 40 (in particular, the right mouse key) rather than a keyboard unit.

Figure 2:
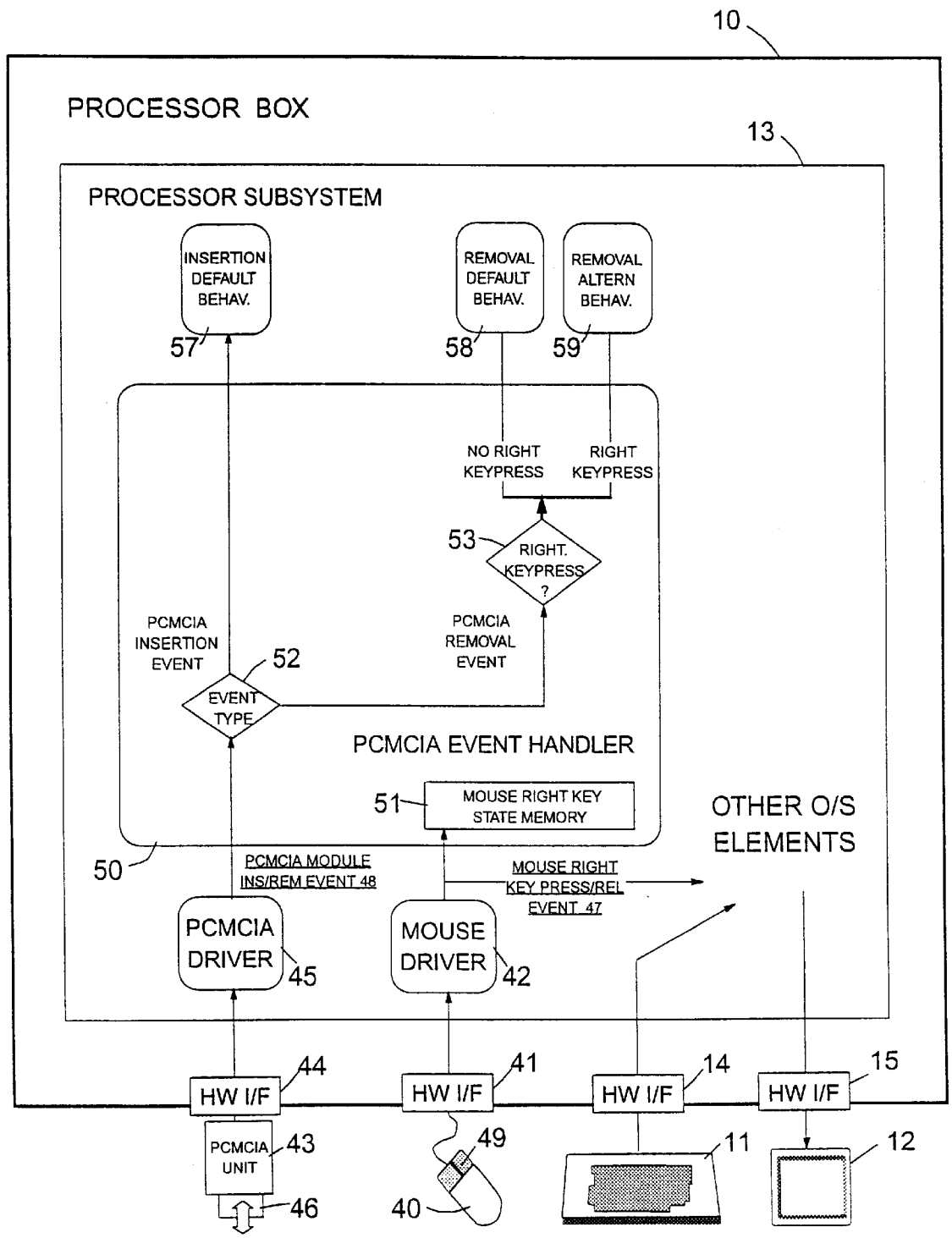
FIG. 2 is a diagrammatic representation of a second computer embodying the invention.

More particularly, in the FIG. 2 embodiment a PCMCIA unit 43 is provided for receiving a PCMCIA module 46, the unit 43 being capable of detecting insertion and removal of module 46. The unit interfaces 43 via hardware interface 44 with a PCMCIA driver 45 that generates, inter alia, module insertion/removal event messages 48 that are sent to a PCMCIA event handler 50. These event messages 48 indicate the event type (insertion or removal). The FIG. 2 computer also comprises a mouse 40 that interfaces via hardware interface 41 with a mouse driver 42. The mouse driver 42 is responsive to operation of the right mouse button 49 to generate mouse right-key press/release event messages 47 that are sent both to a mouse event handler (not shown) and to the PCMCIA event handler 50. The handler 50 uses these event messages 47 to maintain an indication in memory 51 of the current state (pressed/released) of the mouse right key 49.

Upon the handler 50 receiving an insertion/release event message 48, it first checks whether it relates to an insertion or a removal event (step 52). In the present example, if the event is an insertion event then the same default behaviour 57 is always executed regardless of the state of the right mouse key. If, however, the event is a removal event, then the handler 50 next checks (step 53) by reference to memory 51 whether or not the right mouse key is currently depressed—if it is not then a default behaviour 58 is initiated whereas if the right mouse key is depressed, an alternative behaviour 59 is initiated.

It may be noted that in the FIG. 2 embodiment because the removable resource (module 46) and input device (mouse 40) interface with the processor subsystem through different channels, the association of insertion/removal event information with key press information has to be done at a higher level (handler 50) than in the FIG. 1 embodiment where the driver 25 performed this association.

Many variants are possible to the above described embodiments of the invention. For example, the removable resource can be instead of a smartcard or PCMCIA module, a diskette, a removable hard disc, a network connection, a subsidiary computing device, or indeed any resource whose operative connection/disconnection with the computer can be detected and used to trigger a behaviour. It may be noted that the working interconnection between the removable resource and the computer does not need to be a pluggable connection and it could, for example, be an infrared connection.

Where the input device used to provide a sustained user input is a keyboard, then placing of one of the status lock keys (eg CAPS LOCK) in its locked state could be used to indicate a sustained user input. However, this is not preferred as a user is likely not to check the status of such a key in cases where the user does not wish to command a behaviour different from the default one.

Further as regards the input device used to command an alternative behaviour, instead of a keyboard or mouse, this could be a graphics tablet, touchscreen, foot pedal, a two-state switch, a voice response unit, an infra-red controller or any other device capable of providing a sustained user input.

The behaviours produced can be any behaviour desired in the circumstances, including a "do nothing" behaviour.

Not all detected events that concern placing the resource into/out of working relation with the computer need give rise to a behaviour; for example, all insertion events of a smartcard may be ignored or some other condition may need to be fulfilled before events are taken notice of. Information held by the resource itself could be used to determine whether a behaviour was to be triggered upon occurence of an event.

The present invention may be applied to electronic apparatus in general and is not restricted to use with computers.

What is claimed:

1. Electronic apparatus having a processor subsystem arranged to operate under the control of one or more functional program elements, said apparatus comprising:
   a memory for storing one or more state indicators;
   a user input device by which a user can generate a predetermined sustained input to at least one of said functional program elements, said sustained input being recorded by one or more of said state indicators;
   interface means for interfacing with a physically-removable resource that can be moved into and out of working relation with said interface means;
   event-indication means for generating and supplying to said at least one functional program element an event indication in response to removal of said resource out of said working relation with said interface and
   said at least one functional program element being responsive to said event indication to produce different behaviours of said apparatus in dependence on one or more of the state indicators substantially at the time of occurrence of the event indication concerned.

2. Apparatus according to claim 1, wherein said input device is a keyboard and said predetermined sustained input is the sustained operation of a predetermined key of said keyboard.

3. Apparatus according to claim 1, wherein said input device is a mouse and said predetermined sustained input is the sustained operation of a predetermined key of said mouse.

4. Apparatus according to claim 1, wherein said physically removable resource is a smartcard and said interface means is a smartcard interface unit.

5. Apparatus according to claim 1, wherein said physically removable resource is a PCMCIA module and said interface means is a PCMCIA interface unit.

6. Apparatus according to claim 1, wherein said physically removable resource and said interface means interwork via an infrared link.

7. Apparatus according to claim 1, wherein one of said different behaviours is a user session log-off procedure.

8. Apparatus according to claim 1, wherein one of said different behaviours is a "do nothing" behaviour.

9. Apparatus according to claim 1, wherein said apparatus includes display means, one of said different behaviours involving displaying a menu comprising a plurality of options to said user and carrying out at least one of said options subsequently chosen by the user.

10. Apparatus according to claim 1, wherein said input device is operable to produce a plurality of different predetermined sustained inputs, said functional program elements being operative to distinguish between said different predetermined sustained inputs to provide corresponding different behaviours.

11. Apparatus according to claim 1 wherein the
   physically-removable resource is a data-storage resource that can be moved into and out of data-transfer relation with said interface means; and
   said different behaviours involving the transfer of different data from said removable resource to said apparatus.

12. Apparatus according to claim 11, wherein one of said different behaviours is a user session log-on procedure involving the transfer of user-related data from said removable resource for use in user log on.

13. Apparatus according to claim 12, wherein said apparatus includes display means and another of said different behaviours involves displaying to said user data transferred from said removable resource.

14. Apparatus according to claim 11, wherein said input device is a keyboard and said predetermined sustained input is the sustained operation of a predetermined key of said keyboard.

15. Apparatus according to claim 11, wherein said input device is a mouse and said predetermined sustained input is the sustained operation of a predetermined key of said mouse.

16. Apparatus according to claim 11, wherein said physically removable resource is a smartcard and said interface means is a smartcard interface unit.

17. Apparatus according to claim 11, wherein said physically removable resource is a PCMCIA module and said interface means is a PCMCIA interface unit.

18. Apparatus according to claim 11, wherein said physically removable resource and said interface means interwork via an infrared link.

19. Apparatus according to claim 11, wherein one of said different behaviours is a user session log-off procedure.

20. Apparatus according to claim 11, wherein one of said different behaviours is a "do nothing" behaviour.

21. Apparatus according to claim 11, wherein said apparatus includes display means, one of said different behaviours involving displaying a menu comprising a plurality of options to said user and carrying out at least one of said option subsequently chosen by the user.

* * * * *